(12) United States Patent
Mayer

(10) Patent No.: US 9,947,211 B1
(45) Date of Patent: Apr. 17, 2018

(54) PERSONAL PANIC ALARM SYSTEM

(71) Applicant: Giorgio Mayer, New York, NY (US)

(72) Inventor: Giorgio Mayer, New York, NY (US)

(*) Notice: Subject to any disclaimer, the term of this patent is extended or adjusted under 35 U.S.C. 154(b) by 0 days.

(21) Appl. No.: 15/333,567

(22) Filed: Oct. 25, 2016

(51) Int. Cl.
G08B 25/01 (2006.01)
G08B 25/10 (2006.01)
G08B 25/12 (2006.01)
H04W 4/22 (2009.01)

(52) U.S. Cl.
CPC ............ *G08B 25/016* (2013.01); *G08B 25/10* (2013.01); *G08B 25/12* (2013.01); *H04W 4/22* (2013.01)

(58) Field of Classification Search
None
See application file for complete search history.

(56) References Cited

U.S. PATENT DOCUMENTS

| 5,617,074 | A | 4/1997 | White |
| 6,310,539 | B1 | 10/2001 | Rye |
| 7,084,771 | B2 | 8/2006 | Gonzalez |
| 7,248,170 | B2 | 7/2007 | DeOme |
| D554,616 | S | 11/2007 | Pierce |
| D559,138 | S | 1/2008 | Cothron |
| 7,551,079 | B2 | 6/2009 | Ortelle |
| 2008/0214142 | A1* | 9/2008 | Morin ................. G08B 25/016 455/404.2 |
| 2010/0302025 | A1* | 12/2010 | Script ..................... G01P 15/09 340/539.1 |
| 2012/0286951 | A1 | 11/2012 | Hess |
| 2013/0082837 | A1* | 4/2013 | Cosentino ........... G06F 19/3418 340/539.12 |
| 2016/0240075 | A1* | 8/2016 | Eisenman ............... H04W 4/22 |

* cited by examiner

Primary Examiner — Leon-Viet Nguyen

(57) ABSTRACT

The personal panic alarm system is a personal domestic article that is carried or worn by an individual. The personal panic alarm system is adapted for use with a personal data device. The personal panic alarm system further comprises a panic button. When the panic button is activated, the panic button initiates a Bluetooth signal to the personal data device the personal panic alarm system is associated with initiating a predetermined automated communication link. The personal panic alarm system comprises a housing, a switch, a transceiver, a logic module, a battery, and an application.

9 Claims, 6 Drawing Sheets

PERSONAL PANIC ALARM SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of signaling, calling or alarm systems, more specifically, a personal emergency alarm initiation system.

SUMMARY OF INVENTION

The personal panic alarm system is a personal domestic article that is carried or worn by an individual. The personal panic alarm system is adapted for use with a personal data device. The personal panic alarm system further comprises a panic button. When the panic button is activated, the panic button initiates a Bluetooth signal to the personal data device the personal panic alarm system is associated with thereby initiating one or more automated communication options. In one communication scenario, a preprogrammed number is contacted automatically from the personal data device with the call being placed on the speaker function of either: 1) the personal data device such that the user does not need to reach or find the personal data device; or, 2) a speaker mounted within the personal panic alarm system. In alternate communication scenarios, an emergency communication center is contacted in a similar manner. In similar alternative communication scenarios, a preprogrammed text message with GPS coordinates may be initiated using SMS text messaging or text to 911, also referred to as enhanced 911 (E911), services.

These together with additional objects, features and advantages of the personal panic alarm system will be readily apparent to those of ordinary skill in the art upon reading the following detailed description of the presently preferred, but nonetheless illustrative, embodiments when taken in conjunction with the accompanying drawings.

In this respect, before explaining the current embodiments of the personal panic alarm system in detail, it is to be understood that the personal panic alarm system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the personal panic alarm system.

It is therefore important that the claims be regarded as including such equivalent construction insofar as they do not depart from the spirit and scope of the personal panic alarm system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
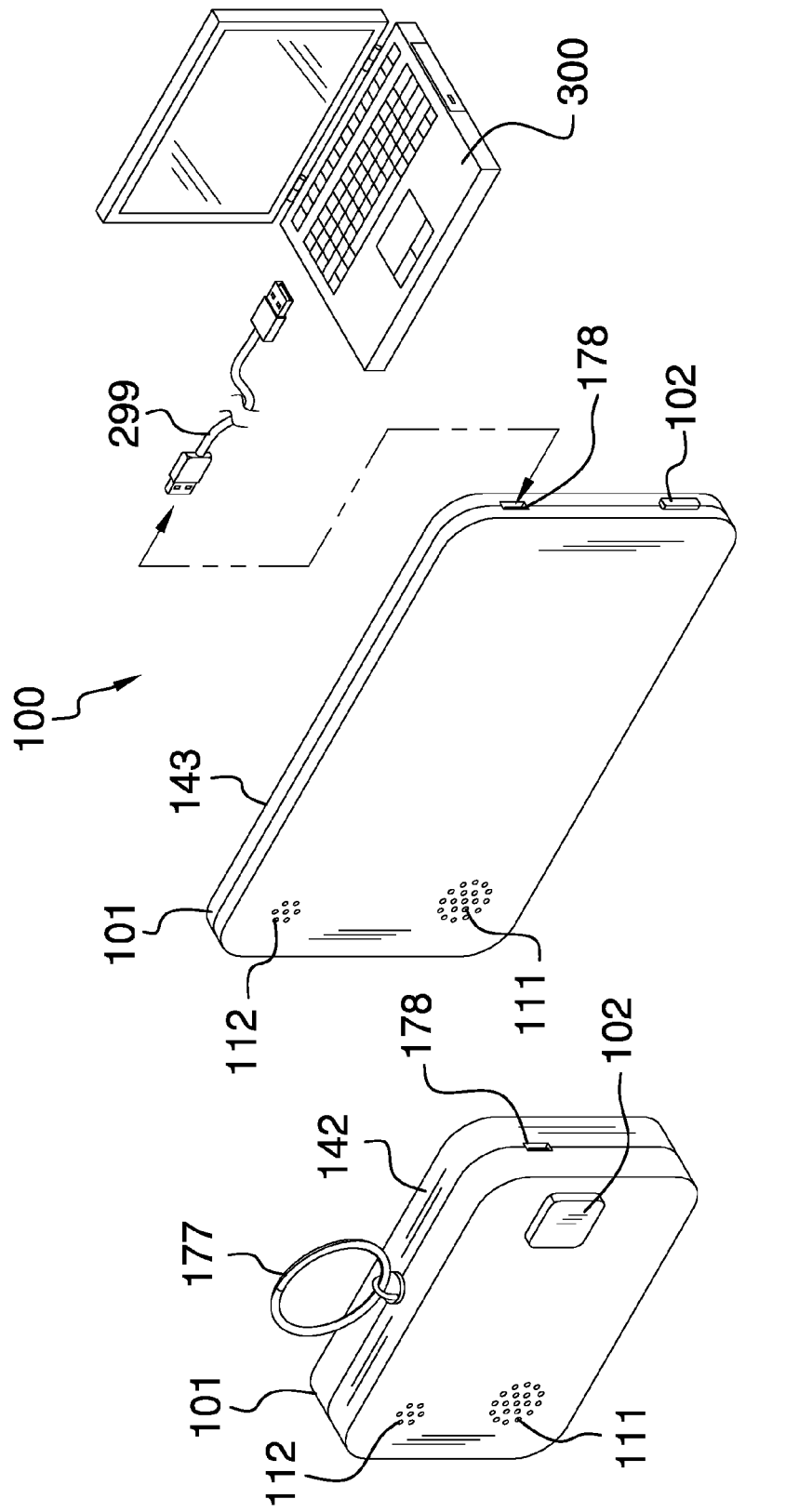
FIG. 1 is a perspective view of an embodiment of the disclosure.
Figure 3:
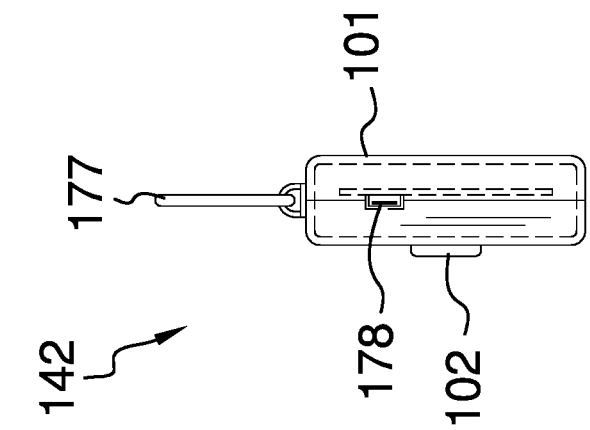
FIG. 3 is a side view of an embodiment of the disclosure.
Figure 2:
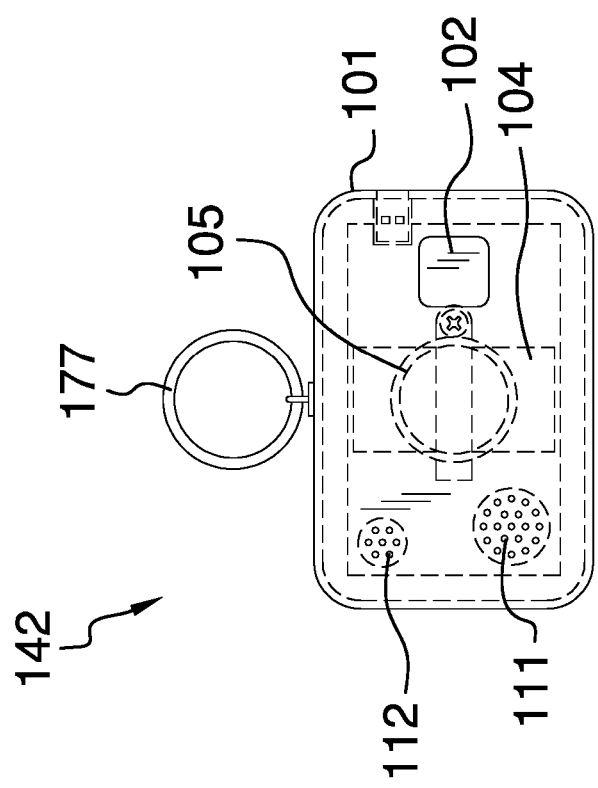
FIG. 2 is a front view of an embodiment of the disclosure.
Figure 4:
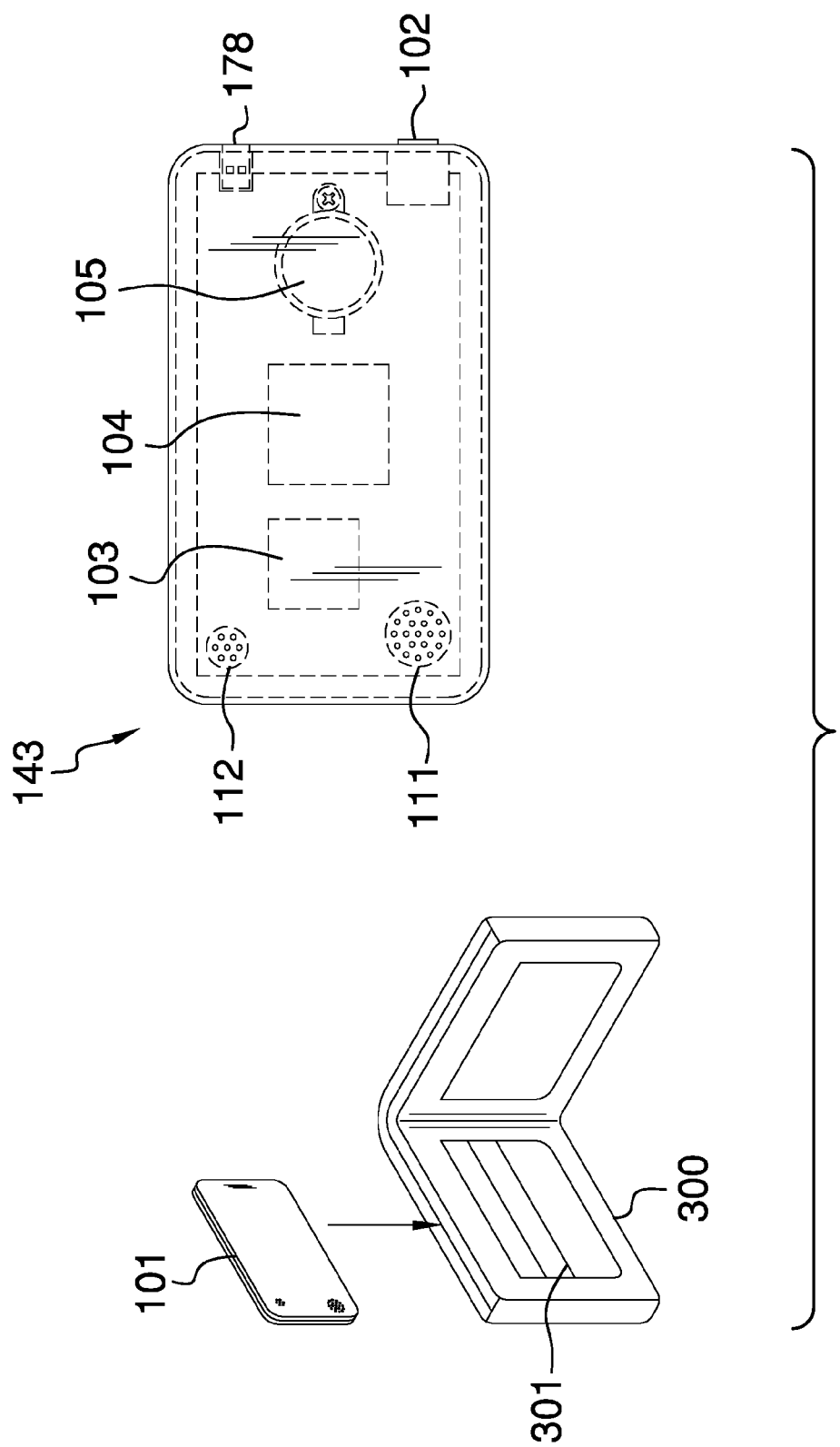
FIG. 4 is a front view of an alternate embodiment of the disclosure.
Figure 5:
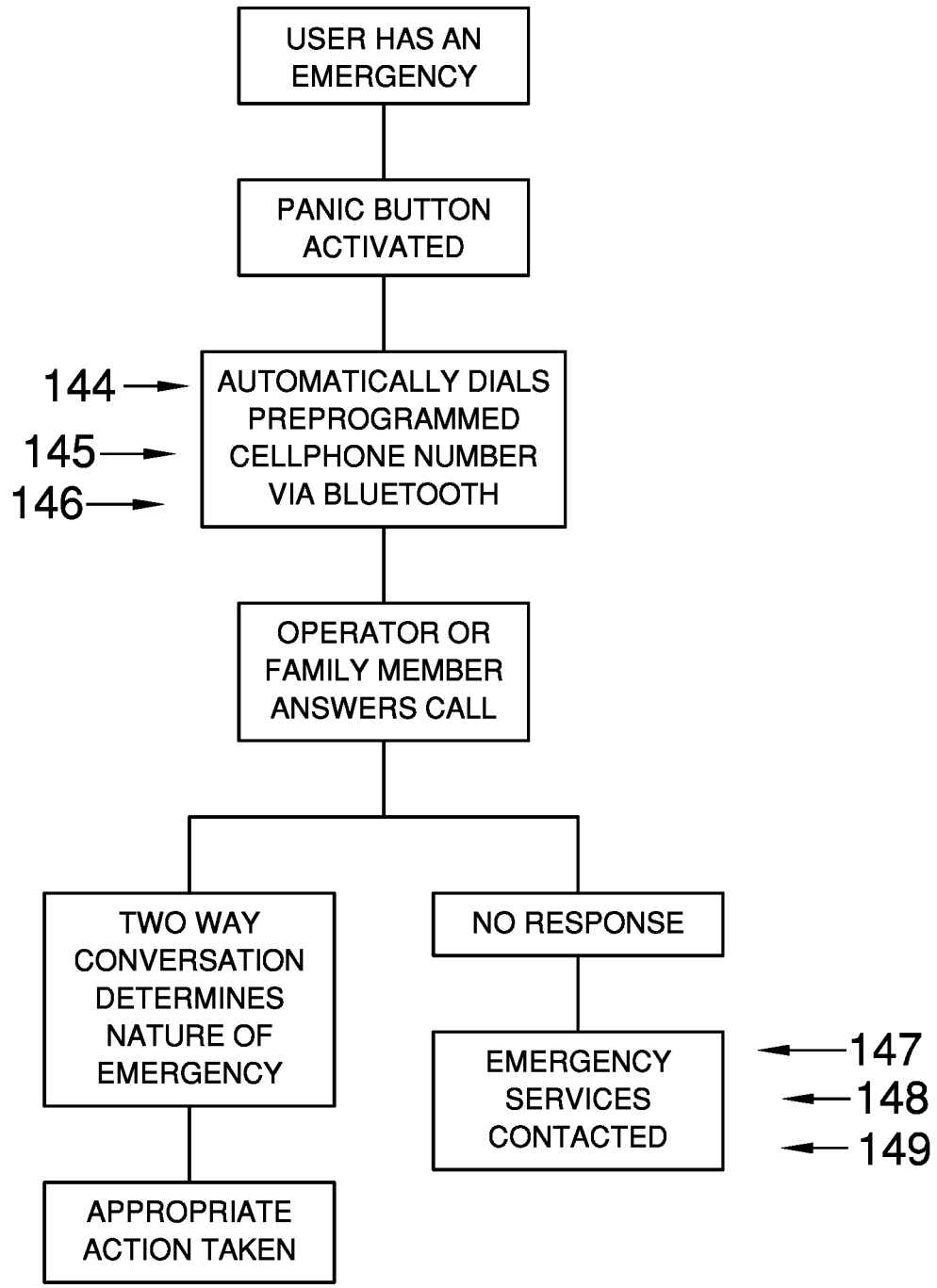
FIG. 5 is a flowchart of embodiments of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7.

The personal panic alarm system 100 (hereinafter invention) comprises a housing 101, a switch 102, a transceiver 103, a logic module 104, a battery 105, and an application 106. The invention 100 is a personal domestic article that is carried or worn by an individual. The invention 100 is adapted for use with a personal data device 131. The invention 100 is further adapted for use with a GPS module 132 commonly provided with personal data devices 131. The switch 102 of the invention 100 may be further defined as a panic button.

When the panic button is activated, the panic button initiates a Bluetooth signal to the personal data device 131 the invention 100 is associated with initiating one or more automated communication options. In one communication scenario, a preprogrammed number is contacted automatically from the personal data device 131 with the call being placed on the speaker function of either: 1) the personal data device 131 such that the user does not need to reach or find the personal data device 131; or, 2) a speaker 111 mounted within the invention 100. In alternate communication scenarios, an emergency communication center is contacted in a similar manner. In similar alternative communication scenarios, a preprogrammed text message with GPS coordinates received from the GPS module 132 may be initiated using SMS text messaging or text to 911 (also referred to as enhanced 911) services.

The housing 101 is a rigid casing that contains the invention 100. The housing 101 is kept on the individual while the invention 100 is in use such that should an emergency arise, the individual has access to the services of the invention 100. As such, it is anticipated that the housing 101 would be formed in such a manner that the housing 101 would be easy to carry and locate and, in the preferred embodiments, would provide in its role as a personal domestic article a supplemental function of value to the individual. Examples of this function would include, but are not limited to, a second potential embodiment of the disclosure 142 wherein the use of the housing 101 provides the supplemental function such as a keychain 177 or the use of housing 101 as jewelry that is worn. In a first potential embodiment of the disclosure, as shown most clearly in FIG. 4, the housing 101 does not incorporate a supplemental function but instead is sized such that the housing 101 can be readily carried within a wallet 400, and may slide into a credit card slot 401 of the wallet 400 (see FIG. 4). In the second potential embodiment of the disclosure 142, as shown most clearly in FIGS. 2 and 3, the housing 101 is adapted to provide a secondary function as a keychain 177.

Figure 6:
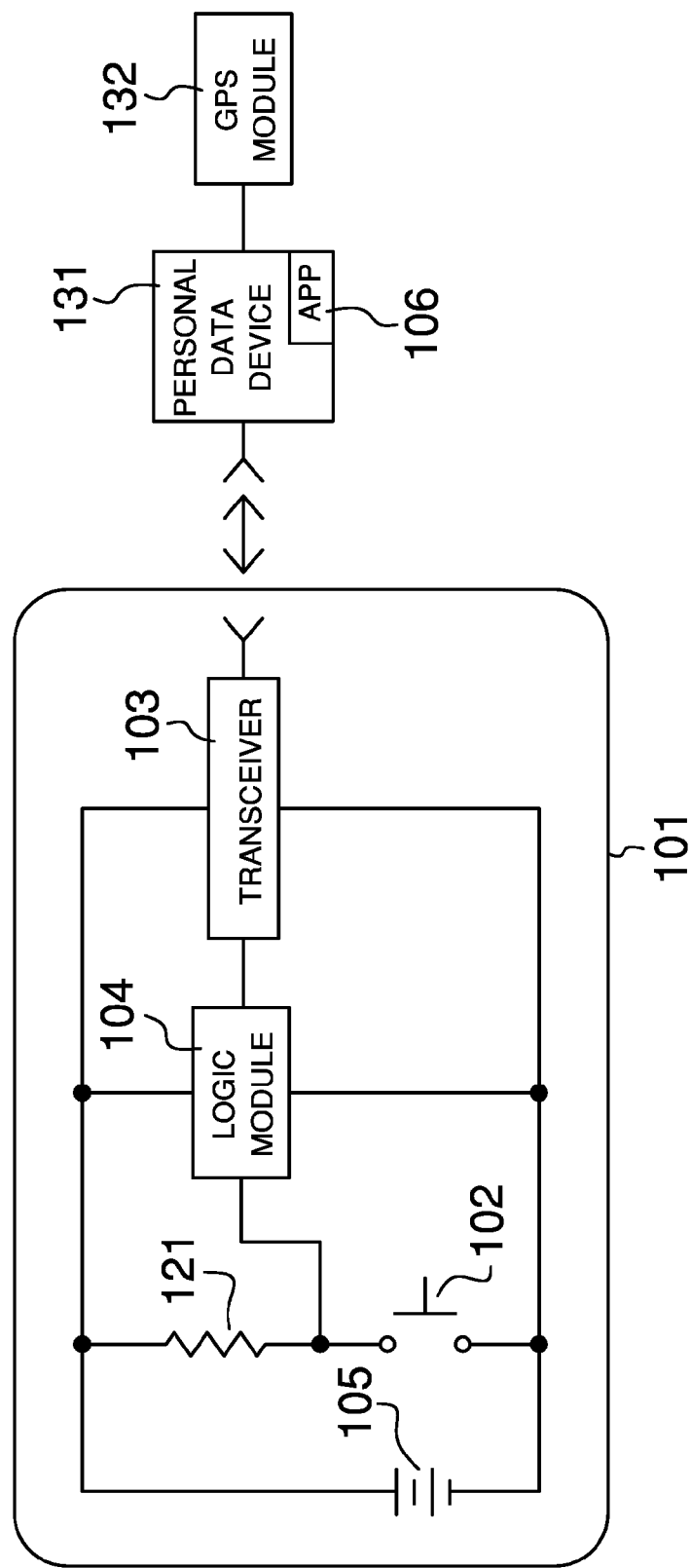
FIG. 6 is a schematic of an embodiment of the disclosure.
Figure 7:
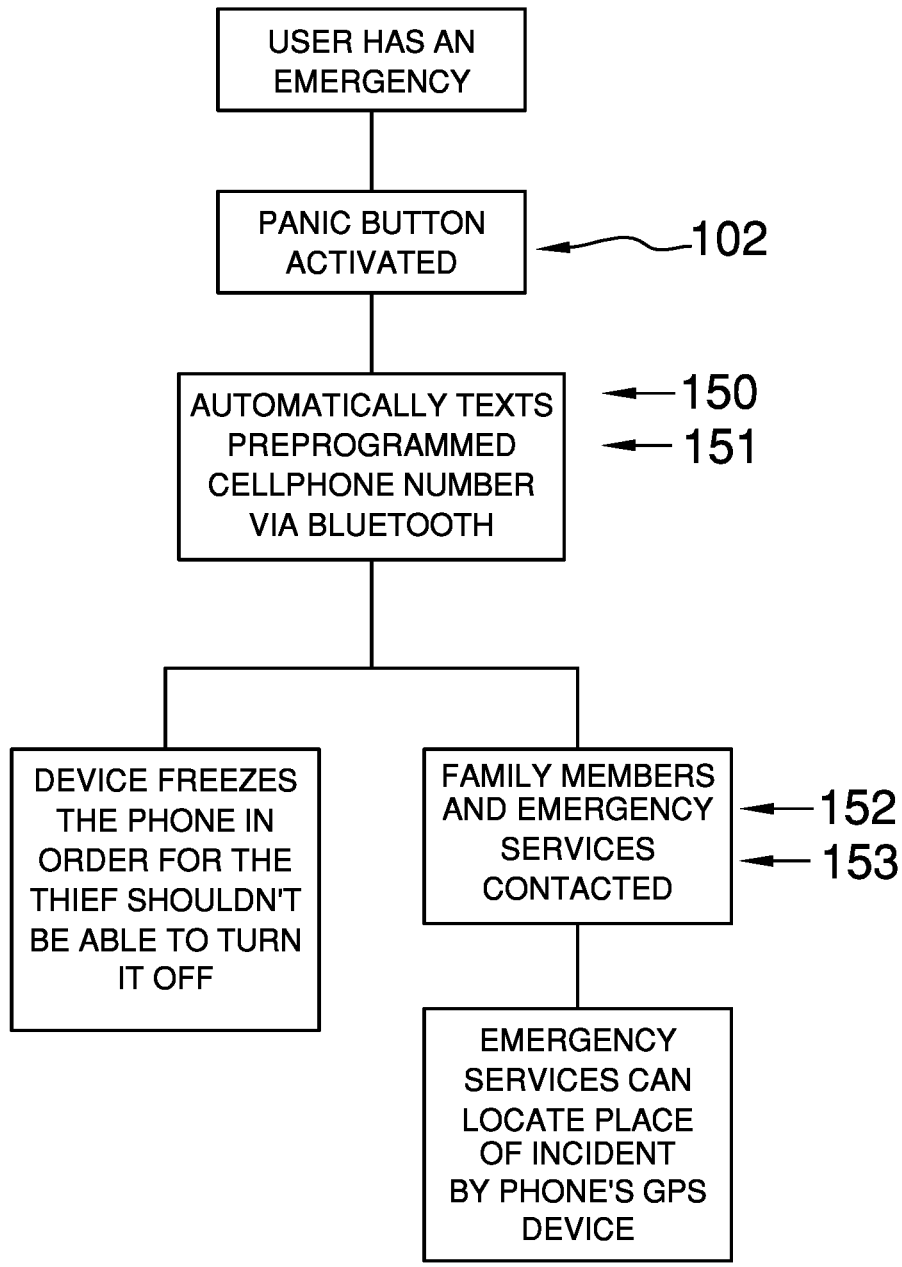
FIG. 7 is a flowchart of alternate embodiment of the disclosure.

The switch 102 is a commercially available normally open single pole momentary switch that is used to initiate the communication scenario of the invention 100. The logic module 104 is a device that is used to monitor the switch 102. As shown in FIG. 6, the logic module 104 monitors the voltage across switch 102. When the switch 102 is closed, the voltage across the switch 102 falls to zero, which triggers the logic module 104 to initiate the transceiver 103. The functionality of the logic module 104 can be formed from discrete components or programmed into a microcontroller device. As shown in FIG. 6, current flow through the switch 102 is regulated by a pull up resistor 121.

The transceiver 103 sends a signal to the personal data device 131, which initiates the operation of the application 106. The application 106 is discussed elsewhere in this disclosure. In the first potential embodiment of the disclosure and the second potential embodiment of the disclosure 142, the transceiver 103 is a commercially available transceiver that uses the Bluetooth protocols that are commonly used on personal data devices 131.

The battery 105 is an energy storage device that provides the electrical energy used by the invention 100.

The application 106 is software that: 1) manages communication between the transceiver 103 and the personal data device 131; and, 2) manages the communications generated by the invention 100. The functionality of the application 106 is most efficiently described through the description of several potential embodiments of the disclosure.

In the first potential embodiment of the disclosure, the housing 101 contains the switch 102, transceiver 103, the logic module 104, and the battery 105.

In the second potential embodiment of the disclosure 142, the housing 101 is a version of the first potential embodiment of the disclosure that further comprises a supplemental function that is described elsewhere in this disclosure.

In a third potential embodiment of the disclosure 143, the housing 101 further comprises a speaker 111 and a microphone 112. The speaker 111 and the microphone 112 are used as a remote speakerphone arrangement associated with the personal data device 131.

In a fourth potential embodiment of the disclosure 144, the application 106 extends the first potential embodiment of the disclosure by automatically contacting a preprogrammed number when the switch 102 is activated and placing the call on the speakerphone of the personal data device 131.

In a fifth potential embodiment of the disclosure 145, the application 106 extends the second potential embodiment of the disclosure 142 by automatically contacting a preprogrammed number when the switch 102 is activated and placing the call on the speakerphone of the personal data device 131.

In a sixth potential embodiment of the disclosure 146, the application 106 extends the third potential embodiment of the disclosure 143 by automatically contacting a preprogrammed number when the switch 102 is activated and routing the call to the speaker 111 and microphone 112 of the housing 101.

In a seventh potential embodiment of the disclosure 147, the application 106 extends the fourth potential embodiment of the disclosure 144 by contacting the emergency services (E911) call center should the call to the preprogrammed number fail to connect. The call to the emergency services call center is placed on the speakerphone of the personal data device 131.

In an eighth potential embodiment of the disclosure 148, the application 106 extends the fifth potential embodiment of the disclosure 145 by contacting the emergency services call center should the call to the preprogrammed number fail to connect. The call to the emergency services call center is placed on the speakerphone of the personal data device 131.

In a ninth potential embodiment of the disclosure 149, the application 106 extends the sixth potential embodiment of the disclosure 146 by contacting the emergency services call center should the call to the preprogrammed number fail to connect. The call to the emergency services call center is routed to the speaker 111 and microphone 112 of the housing 101.

In a tenth potential embodiment of the disclosure 150, the application 106 operates identically to the fourth potential embodiment of the disclosure 144 except that the voice call to the preprogrammed number is replaced with a preprogrammed text message to the preprogrammed number. In the tenth potential embodiment of the disclosure 150, the application 106 further queries the GPS module 132 of the personal data device 131 to determine the GPS coordinates of the personal data device 131 and includes the GPS coordinates of the personal data device 131 in the transmitted text message.

In an eleventh potential embodiment of the disclosure 151, the application 106 operates identically to the fifth potential embodiment of the disclosure 145 except that the voice call to the preprogrammed number is replaced with a preprogrammed text message to the preprogrammed number. In the eleventh potential embodiment of the disclosure 151, the application 106 further queries the GPS module 132 of the personal data device 131 to determine the GPS coordinates of the personal data device 131 and includes the GPS coordinates of the personal data device 131 in the transmitted text message.

In a twelfth potential embodiment of the disclosure 152, the application 106 extends the tenth potential embodiment of the disclosure 150 by contacting the emergency services call center with a preprogrammed text to 911 (E911) message that includes the GPS coordinates of the personal data device 131.

In a thirteenth potential embodiment of the disclosure 153, the application 106 extends the eleventh potential embodiment of the disclosure 151 by contacting the emergency services call center with a preprogrammed text to 911 message that includes the GPS coordinates of the personal data device 131.

It shall be noted that in any embodiment of the invention 100, a communication port 178 may be provided on the applicable housing 101 in order to provide wired connection via a cord 299 with a recharging module 300. The communication port 178 may be a USB port or other data exchange portal that is typically associated with small electronic devices. It shall be noted that the recharging module 300 may be a computer that is able to upload and download data with respect to the invention 100.

The following definitions were used in this disclosure:

Application or App: As used in this disclosure, an application or app is a self-contained piece of software that is especially designed or downloaded for use with a personal data device.

Battery: As used in this disclosure, a battery is a container consisting of one or more cells, in which chemical energy is converted into electricity and used as a source of power.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Housing: As used in this disclosure, a housing is a rigid casing that encloses and protects one or more devices.

Microcontroller: As used in this disclosure, a microcontroller is a small computer, often on a single integrated circuit, containing a processor core, memory, and programmable input/output peripherals.

Microphone: As used in this disclosure, a microphone is an electrical device that converts an audible sound into an electrical signal.

Personal Data Device: As used in this disclosure, a personal data device is a handheld device that is used for managing personal information and communication. Examples of personal data device include, but are not limited to, cellular phones, tablets and smart phones.

Speaker: As used in this disclosure, a speaker is an electrical device that converts an electrical signal into an audible sound.

Transceiver: As used in this disclosure, a transceiver is a device that is used to transmit and/or receive radio signals.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An alarm comprising:
a housing, a switch, and a transceiver; a logic module and an application;
wherein the alarm is a personal domestic article that is carried or worn by an individual;
wherein the alarm is adapted for use with a personal data device;
wherein the alarm further comprises a panic button;
wherein the alarm is associated with the personal data device;
wherein when the panic button is activated, the panic button initiates a radio signal to the personal data device the alarm is associated;
wherein the radio signal initiates the execution of one or more automated communication options;
wherein the housing contains the switch, transceiver, and the logic module;
wherein the application is initiated by the transceiver;
wherein the application automatically places a call to a preprogrammed number when the switch is activated;
wherein the application routes the call to a speakerphone of the personal data device;
wherein the alarm further comprises a logic module;
wherein the application places a call to an emergency services call center should the call to the preprogrammed number fail to connect;
wherein the application routes the call to the emergency services call center to the speakerphone of the personal data device;
wherein the switch is a normally open momentary switch;
wherein the transceiver is a Bluetooth transceiver;
wherein the housing further comprises a supplemental function;
wherein the application is initiated by the transceiver;
wherein the application automatically places a call to a preprogrammed number when the switch is activated;
wherein the application routes the call to the speakerphone of the personal data device;
wherein the alarm further comprises a logic module;
wherein the application places a call to an emergency services call center should the call to the preprogrammed number fail to connect;
wherein the application routes the call to the emergency services call center to the speakerphone of the personal data device;
wherein the housing further comprises a speaker and a microphone;
wherein the application is initiated by the transceiver;
wherein the application automatically places a call to a preprogrammed number when the switch is activated;
wherein the application routes the call to the speaker and the microphone;
wherein the alarm further comprises a logic module;
wherein the application places a call to an emergency services call center should the call to the preprogrammed number fail to connect;
wherein the application routes the call to the emergency services call center to the speaker and the microphone.

2. The alarm according to claim 1
wherein the application is initiated by the transceiver;
wherein the application automatically sends a preprogrammed text message to a preprogrammed number when the switch is activated.

3. The alarm according to claim 2
wherein the alarm further comprises a logic module;
wherein the application sends a text to 911 message to an emergency services call center.

4. The alarm according to claim 3 wherein the preprogrammed text message contains the GPS coordinates of the personal data device.

5. The alarm according to claim 1
wherein the housing further comprises a supplementary function;
wherein the application is initiated by the transceiver;
wherein the application automatically sends a preprogrammed text message to a preprogrammed number when the switch is activated.

6. The alarm according to claim 5
wherein the alarm further comprises a logic module;
wherein the application sends a text to 911 message to an emergency services call center;
wherein the preprogrammed text message contains the GPS coordinates of the personal data device.

7. The alarm according to claim 5 wherein the housing includes a communication port in order to provide wired connection via a cord with a recharging module in order to recharge the battery.

8. The alarm according to claim 7 the housing is sized to carried be within a wallet; wherein the housing has a size and shape consistent with a credit card in order for said housing to be adapted to slide into a credit card slot of the wallet.

9. The alarm according to claim 8 wherein the housing includes a keychain thereon.

\* \* \* \* \*